Jan. 1, 1952     M. H. L. SÉDILLE     2,580,962
CONTROL MEANS FOR THE NOZZLE
OUTLET AREA OF JET ENGINES
Filed May 9, 1946     2 SHEETS—SHEET 1
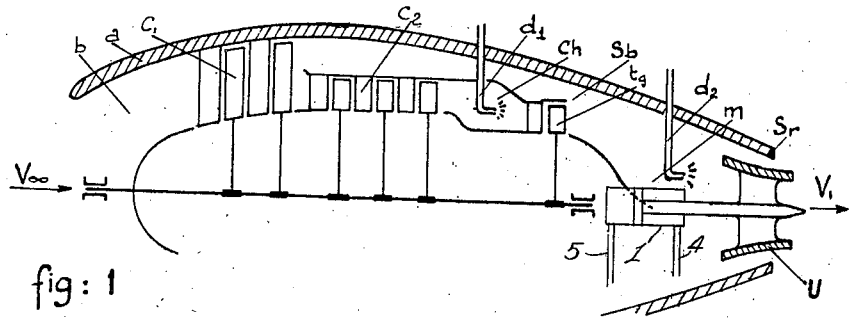
fig: 1
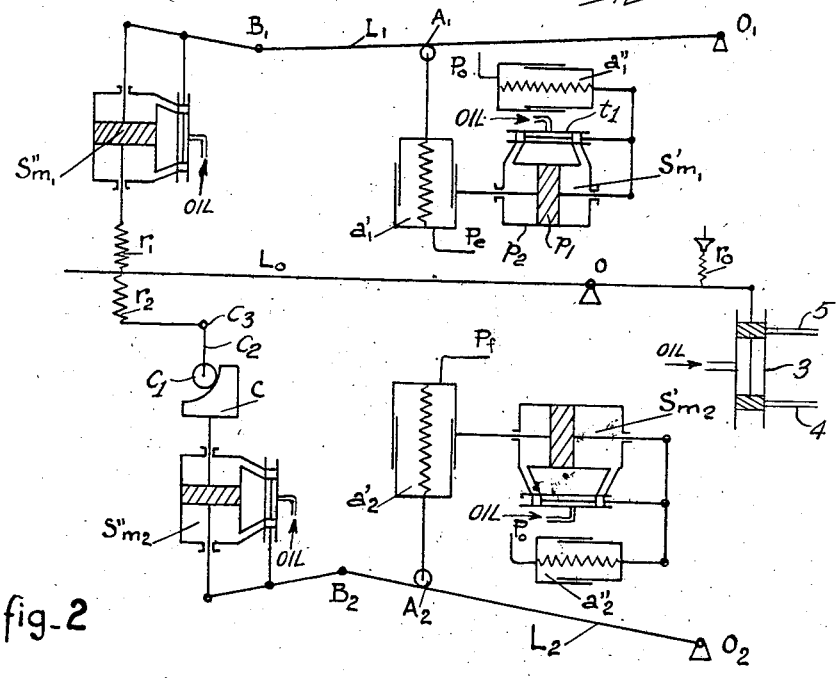
fig. 2
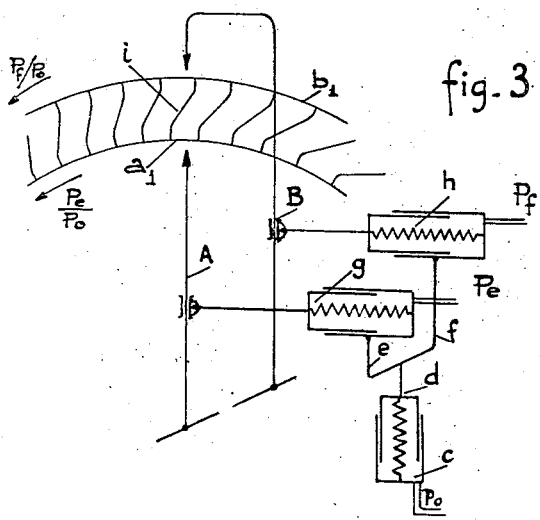
fig. 3
*Inventor*
Marcel H. L. Sédille
By Watson, Cole, Grindle &
Watson
*Attys*

Patented Jan. 1, 1952

2,580,962

UNITED STATES PATENT OFFICE 2,580,962

CONTROL MEANS FOR THE NOZZLE OUTLET AREA OF JET ENGINES

Marcel Henri Louis Sédille, Paris, France, assignor to Societe Rateau (Societe Anonyme), Paris, France, a company of France, and René Anxionnaz, Paris, France Application May 9, 1946, Serial No. 668,569
In France June 13, 1945

6 Claims. (Cl. 60—35.6)

High speed vehicles, and in particular aircraft, may be driven by a reaction jet propeller the air compressor of which may include a first compressor constituted by a centrifugal arrangement or preferably by an axial compressor. The compressor is driven by a thermic engine including a second centrifugal or axial compressor, one or more combusion chambers with burners and lastly an expansion turbine. The air compressed in the first compressor and the exhaust gases from the turbine are then admixed inside the chamber, with or without additional heat being supplied by one or more complementary burners. The driving gases then expand through a reaction jet nozzle in a direction opposed to the movement of the vehicle.

The rate of operation of the propelling means depends on the altitude of flight and on the speed of displacement of the vehicle, on the amount of fuel admitted into the burners and lastly on the arrangement of the different members of the propeller including more particularly the cross-sectional area allowed for the operating fluid.

My invention has for its object a system for adjusting the outlet cross-sectional area of the reaction jet nozzle with a view to producing at each moment the best conditions of operation for the propelling means; it consists chiefly in means for automatic adjustment or if required for a hand adjustment of the position of the closing member of the reaction jet nozzle as a function of suitable parametric values.

The following description given with reference to accompanying drawings shown by way of example and not in a limitative sense, will allow the execution of the invention to be easily understood; the features appearing both in the drawing and in the specification forming of course, part of said invention. In said drawings:

Fig. 1 is a cross-sectional view of a reaction jet turbine for the propulsion of an aircraft advancing at high speed.

Fig. 2 shows an automatic device for adjusting the outlet cross-sectional area of the reaction jet nozzle.

Fig. 3 shows an indicator for the dash-board allowing the pilot to execute a hand-operated adjustment.

Figure 3A:
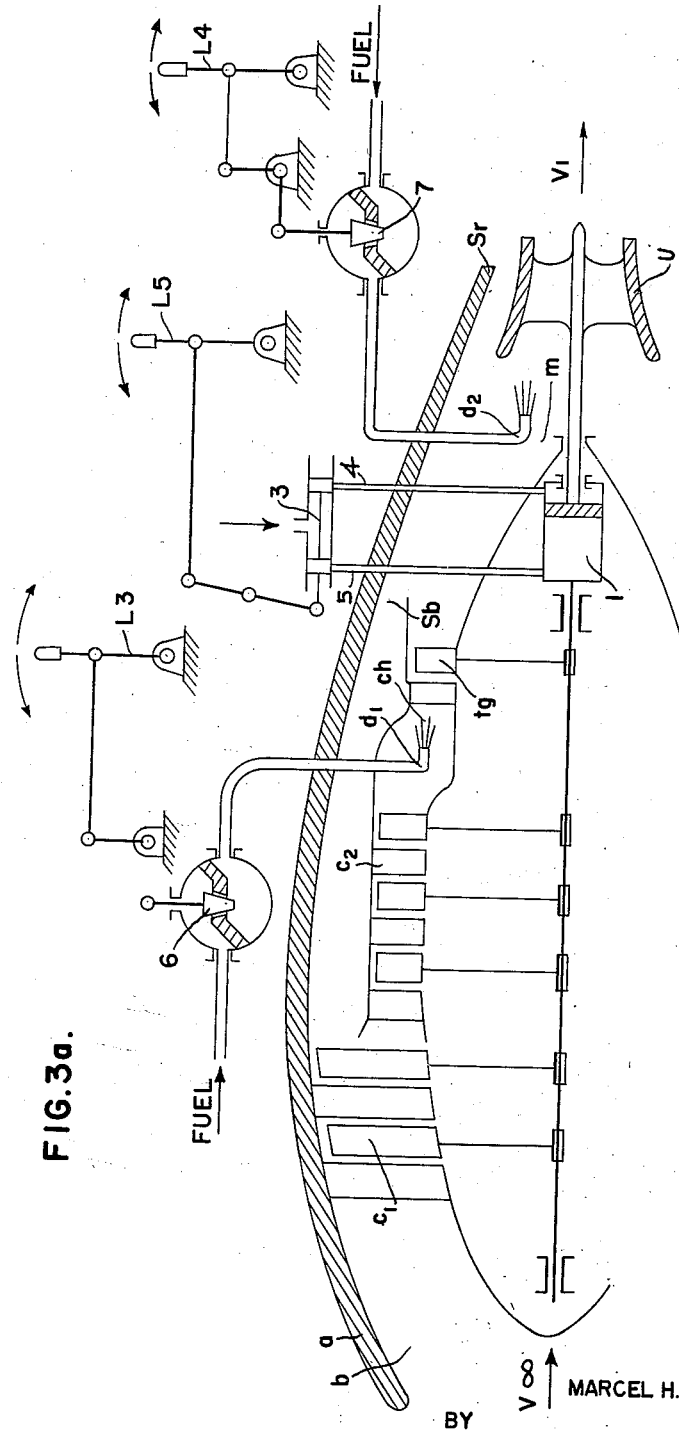
Fig. 3a shows the same reaction jet turbine as in Fig. 1, but provided with two hand actuated levers for controlling the injection of fuel into the combustion chambers and the closing means for the reaction nozzle.

Considering a reaction jet propelling means comprising a turbine, said means being of the above disclosed type. It has been assumed by way of example that the operating air is taken into the front of the propelling means with a relative speed equal to the speed of the aircraft $V_\infty$. The fairing $a$ of the machine includes at its front end a chamber $b$ the cross-section of which increases gradually and inside which the air is submitted to a first compression through a damping of its speed. The operating air is then submitted to a first mechanical compression inside the compressor $C_1$ and then a fraction of this air which takes part in the cycle of the thermic engine including the gas turbine is submitted to a second mechanical compression inside the compressor $C_2$. At the outlet from $C_2$, the air is submitted to heating inside the combustion chamber $C_h$ fed with one or more burners $d_1$ and expands while producing driving energy inside the gas turbine $t_g$ which provides for the driving of the compressors $C_1$ and $C_2$.

A portion of the air output delivered by $C_1$ forming diluting air is mixed with the combustion gases from the exhaust of the turbine $t_g$, the mixture being formed inside a chamber $m$ provided if required with one or more burners $d_2$. The gaseous mixture expands, finally, inside the reaction nozzle $S_r$ out of which it escapes at the speed $V_1$.

As a modification, the flow of air at low pressure or diluting air may be done away with, in which case the propelling means are fed with a single stream of air which passes in succession through the compressor, the combustion chambers, the turbine and the reaction nozzle.

The outlet cross-section of the reaction jet nozzle is defined in either case by the position of closing means of any desired shape.

It is apparent that with such a system it may be of value to be able to adjust the cross-section of the reaction nozzle. This is the case in particular when the auxiliary burners $d_2$ are used as it is then necessary for the outlet cross-section of the reaction nozzle to be increased in order to take into account the increase in volume of the gases produced through this reheating, if it is not desired to modify the conditions of operation of the engine, a gas turbine having a constant exhaust at its outlet.

Generally speaking, it may be stated that for a given cross-section of the reaction jet nozzle, the speed of the propelling means depends on a certain number of variables including in particular the amount of fuel injected into the burners $d_1$ and $d_2$, the speed of the aircraft and the altitude of flight. The different rates may be ascertained either experimentally or through calculation.

For any other value of the cross-section of the reaction jet nozzle, there is obtained another series of rates of operation of the engine and it is possible to ascertain the cross-section of the nozzle adapted to produce the most suitable rates of operation. It is possible for instance to adjust the conditions of operation of the compressor so that it may operate at optimum efficiency for each speed while avoiding the zone of pumping, or else a constant temperature of admission of the gases into the turbine may be sought for or again any other conditions considered as expedient such as that consisting in the obtention of the maximum efficiency of the whole at all rates of operation.

It is thus apparent that the cross-section of the reaction jet nozzle should be a function of the above-mentioned parameters i. e. altitude, speed of the aircraft and amount of injected fuel, the function being necessarily complex but yet capable of definition experimentally or through calculation.

However, and as, generally speaking, the opening of the jet reaction nozzle reacts on the operation of the propelling means only through the agency of the pressure produced at the exhaust of the gas turbine, it is sufficient to conform with a law binding said pressure to the operation parameters of the propelling means themselves for obtaining a proper operation of the latter without taking into account the other variables. These parameters are then the pressure and the temperature at the suction of the compressor and its speed of rotation. Instead of the latter, it is possible to use in an equivalent manner the pressure prevailing inside the combustion chambers.

It is possible moreover to show that if the pressure and temperature at the suction end of the compressor vary, there are obtained rates of operation of the propelling means which are aerodynamically similar, i. e. for said rates of running the efficiencies of the different members are retained and the temperatures at the different points of the circuit remain in the same ratio, if the ratio between the pressures remains unvarying.

It is therefore sufficient if $P_e$ designates the pressure ahead of the reaction jet nozzle, $P_o$ the pressure at the suction end of the compressor and $P_f$ the pressure inside the combustion chambers to conform with a law of the type:

$$\frac{P_e}{P_o} = f\left(\frac{P_f}{P_o}\right)$$

that is to say the ratio $$\frac{P_e}{P_f}$$

is a function of the ratio $$\frac{P_f}{P_o}$$

In accordance with the invention, it is possible to follow the above law of variations by causing the auxiliary motor controlling the throttling means U of the reaction nozzle to receive an impulse proportional to the difference between the ratio $$\frac{P_e}{P_o}$$

and the function $$f\left(\frac{P_f}{P_o}\right)$$

said ratio and said function $$f\left(\frac{P_f}{P_o}\right)$$

being each translated into mechanical terms through an adjusting system allowing a displacement of a stationary point.

Fig. 2 illustrates diagrammatically a form of execution of the adjusting means corresponding to the above disclosure and given by way of example and by no means in a limitative sense. The adjusting means adopted are based on the action, on a lever, of a first impulse proportional to $$\frac{P_e}{P_o}$$

and, in the opposite direction, of a second impulse proportional to the function $$f\left(\frac{P_f}{P_o}\right)$$

The angular displacements of the lever considered are then proportional to $$\frac{P_e}{P_o} - f\left(\frac{P_f}{P_o}\right)$$

and are used for controlling the position of the closing means.

The first impulse is provided as follows:

A lever $L_1$ is pivotally secured to the point $O_1$. A pressure responsive device $a'_1$ transmits to the lever $L_1$ a displacement proportional to $P_e$, but its point of application $A_1$ moves with reference to the pivot of the lever $L_1$ through the action of a second pressure responsive device $a''_1$ producing a displacement proportional to $P_o$. As shown in Fig. 2, the displacement of the pressure responsive device $a'_1$ under the action of the pressure responsive device $a''_1$ is assured for instance through the agency of an auxiliary motor $S'm_1$ comprising a distributor of fluid under pressure $t_1$ and a motive piston $p_1$ moving into cylinder $p_2$. The linear displacement of the end $B_1$ of the lever $L_1$ is then proportional to the ratio $$\frac{P_e}{P_o}$$

The linear displacement of the point $B_1$ is transformed into a force proportional thereto through an auxiliary motor $S''m_1$ similar to the foregoing and acting through the agency of a spring $r_1$ on a lever $L_0$ pivotally secured at $O$.

The second impulse is ensured in a similar manner through an arrangement including a lever $L_2$ pivotally secured to the point $O_2$ while a pressure responsive device $a'_2$ gives the lever $L_2$ a displacement proportional to $P_f$ and a pressure responsive device $a''_2$ with the auxiliary motor $S''m_2$ moves the application point $A_2$ proportionally to $P_o$. The linear displacement of the end $B_2$ of the lever $L_2$ is then proportional to the ratio $$\frac{P_f}{P_o}$$

The linear displacement of the point $B_2$ is transformed into a force proportional thereto through the agency of an auxiliary motor $S''m_2$. Said force is applied to the cam C which in turn transmits a force depending upon the shape of said cam to roller $C_1$ mounted on a cranked lever $C_2$ pivotally mounted at $C_3$. Finally the force is transmitted through spring to lever $L_0$.

The lever $L_0$ is thus submitted to an effort proportional to $$\frac{P_e}{P_o} - f\left(\frac{P_f}{P_o}\right)$$

the function $f$ depending upon the shape of cam C. The neutral position of lever $L_0$ for which the law of adjustment is satisfied is provided by an adjusting spring $r_0$. The jet propeller being in operation, the throttling member is regulated for having values of $P_o$, $P_e$ and $P_f$ satisfying to the law $$\frac{P_e}{P_o} = f\left(\frac{P_f}{P_o}\right)$$

The lever $L_0$ must be thus in its neutral position. If this is not the case, spring $r_0$ is adjusted for placing lever $L_0$ in its neutral position. The device is thus adjusted. Any shifting with reference to the law to be followed corresponds to an angular displacement of $L_0$ acting then through an auxiliary motor of any suitable mechanical, hydraulic, pneumatic, electric or the like type on the position of the shutter of the reaction nozzle. Shown on the drawing is a hydraulic cylinder 1, the piston of which acts upon throttle member U. Lever $L_0$ moves a distributor 3 which conduits 4 or 5 admits fluid under pressure on one side or on the other side of said piston.

With a view to defining the rate of operation of the propelling means, there are provided hereinabove pressure elements forming the most easily measurable elements. It is possible to choose other variables and instead of $$\frac{P_f}{P_o}$$

for instance it is possible to use the following ratios which depend upon $$\frac{P_f}{P_o} - \frac{N}{\sqrt{T_o}}, \frac{I\sqrt{T_o}}{P_o}, \frac{T_a}{T_o}, \text{ etc.,}$$

in which expressions N designates the speed of rotation of the compressor, $T_o$ the absolute temperature of the air entering the compressor, $T_a$ the absolute temperature before the expansion nozzle, and I the weight of air flowing through the cross-section per unit of time.

Similarly, instead of making use of the ratio $$\frac{P_f}{P_o}$$

it is possible to use a partial compression ratio of the compressor as designated for instance by $$\frac{P_{f'}}{P_o}$$

$P_{f'}$ being the pressure in an intermediary stage of the compressor.

By reason of the complex character of the adjustment thus executed it is also possible to allow the aircraft pilot to control hand controlled adjusting members for the injection of fuel and the closing means for the reaction nozzle. Fig. 3a shows such an arrangement wherein levers $L_3$ and $L_4$ control the throttle valves 6 and 7 mounted on the fuel pipes feeding respectively burners $d_1$ and $d_2$, while lever $L_5$ controls the oil distributor 3 for the hydraulic cylinder operating throttle member U. In order that the pilot may be capable of controlling such operations, it is sufficient that he may be capable of checking on a suitable indicator the fact that the operating law $$\frac{P_e}{P_o} = f\left(\frac{P_f}{P_o}\right)$$

is actually verified.

Fig. 3 shows by way of example and by no means in a limitative sense an indicator of the above type capable of being carried on the dash board of the aircraft. The apparatus includes two indicator hands A and B centrally carried by a common axis shown in perspective view and the tips of which move in front of two graduated sectors $a_1$ and $b_1$. The pressure responsive device $c$ is submitted to the pressure $P_o$ and displaces a set $d$ the two arms of which $e$ and $f$ carry respectively a pressure responsive device $g$ which gives the hand A a displacement proportional to $P_e$ and a second pressure responsive device $h$ giving the hand B a displacement proportional to $P_f$. The responsive devices $g$, $h$ act on the hands through the agency of slides so that the points of application of the pressure on the hands, move in accordance with the displacements of the leverage $d$. Under such condition the hand A indicates on the corresponding dial $a_1$ a value proportional to $$\frac{P_e}{P_o}$$

and the hand B a value proportional to $$\frac{P_f}{P_o}$$

The graduations of the dials or sectors $a_1$ and $b_1$ are connected through a system of corresponding lines such as $i$ for which the equation $$\frac{P_e}{P_o} = f\left(\frac{P_f}{P_o}\right)$$

is satisfied. Therefore when the injection of fuel and the position of the throttling member U are in such a relation that the said equation is satisfied, hands A and B come in front of the respective ends of a same line $i$. When the pilot varies the rate of operation of the plant, by acting on lever $L_3$ or $L_4$ (Fig. 3a) or both, the equation is no more satisfied and this is indicated by the fact that hands A and B do no more lie on a same line $i$. The pilot must then act on lever $L_5$ so as to restore the correspondency of the hands on a same line $i$.

What I claim is:

1. In a jet propulsion unit: an air compressor, at least one combustion chamber fed with air under pressure from said compressor, a gas turbine fed with hot gases from said combustion chamber and adapted to drive the compressor, a jet forming nozzle receiving exhaust gases from said turbine, throttling means associated with said nozzle for varying the cross-section area of said nozzle, detecting means responsive to the pressure $P_o$ on the suction side of said compressor, detecting means responsive to the pressure $P_f$ in said combustion chamber, detecting means responsive to the pressure $P_e$ before the intake of said nozzle, and means for operating said throttling means in response to said detecting means in such a manner that the ratio $$\frac{P_e}{P_o}$$

is a determined function of the ratio $$\frac{P_f}{P_o}$$

2. In a jet propulsion unit: an air compressor, at least one combustion chamber fed with air under pressure from said compressor, a gas turbine fed with hot gases from said combustion chamber and adapted to drive the compressor, a jet forming nozzle receiving exhaust gases from said turbine, throttling means associated with said nozzle for varying the cross section area of said nozzle, means responsive to the pressure ratio $$\frac{P_e}{P_o}$$

wherein $P_e$ is the pressure prevailing in the unit before the intake of said nozzle and $P_o$ the pressure prevailing on the suction side of said compressor, means responsive to the pressure ratio $$\frac{P_f}{P_o}$$

wherein $P_f$ is the pressure in said combustion chamber, and means for operating said throttling means in response to both pressure ratio responsive means in such a manner that the ratio $$\frac{P_e}{P_o}$$

remains a determined function of $$\frac{P_f}{P_o}$$

3. In a jet propulsion unit: an air compressor, at least one combustion chamber fed with air under pressure from said compressor, a gas turbine fed with hot gases from said combustion chamber and adapted to drive the compressor, a jet forming nozzle receiving exhaust gases from said turbine, throttling means associated with said nozzle for varying the cross section area of said nozzle, detecting means responsive to the pressure $P_e$ prevailing in the unit before the intake of said nozzle, detecting means responsive to the pressure $P_o$ on the suction side of said compressor, detecting means responsive to the pressure $P_f$ prevailing in said combustion chamber, means operatively connected with the first and the second named detecting means and responsive to the pressure ratio $$\frac{P_e}{P_o}$$

means operatively connected with the second and the last named detecting means and responsive to the pressure ratio $$\frac{P_f}{P_o}$$

and means for operating said throttling means so that the ratio $$\frac{P_e}{P_o}$$

remains a determined function of $$\frac{P_f}{P_o}$$

4. In a jet propulsion unit: an air compressor, at least one combustion chamber fed with air under pressure from said compressor, a gas turbine fed with hot gases from said combustion chamber and adapted to drive said compressor, a jet forming nozzle receiving exhaust gases from said gas turbine, throttling means combined with said nozzle for varying the cross-sectional area thereof, means responsive to the ratio $$\frac{P_e}{P_o}$$

means responsive to the ratio $$\frac{P_f}{P_o}$$

$P_o$ being the pressure on the suction side of the compressor, $P_e$ the pressure prevailing in the unit before the intake of said nozzle and $P_f$ the pressure in the combustion chamber, means for transforming the ratio $$\frac{P_e}{P_o}$$

into a force proportional thereto, means for transforming the ratio $$\frac{P_f}{P_o}$$

into a force which is predetermined function of said ratio $$\frac{P_f}{P_o}$$

a pivoting lever operatively connected to said throttling means for controlling it and means for applying to said lever in opposition the first named and the second named forces respectively.

5. In a jet propulsion unit: an air compressor, at least one combustion chamber fed with air under pressure from said compressor, a gas turbine fed with hot gases from said chamber and adapted to drive the compressor, a jet forming nozzle receiving exhaust gases from said turbine, throttling means combined with said nozzle for adjusting the cross-sectional area thereof, means for transforming the pressure ratio $$\frac{P_e}{P_o}$$

into a movement proportional thereto, means for transforming the pressure ratio $$\frac{P_f}{P_o}$$

into a movement proportional thereto, each transforming arrangement including an elementary lever, a stationary pivot for said lever, a pressure sensitive device submitted to the action of $P_e$ or $P_f$ according to the transforming arrangement considered and adapted to displace its point of application on the corresponding elementary lever through a distance proportional to said pressure, and a second pressure sensitive device submitted to the pressure $P_o$ and adapted to displace the point of application of the first pressure sensitive device through a distance proportional to $P_o$, a pivoting lever operatively connected to said throttling means in order to control it, a cam operatively connected to a point of the elementary lever of the second transforming arrangement corresponding to $$\frac{P_f}{P_o}$$

in order to give a movement equal to a determined function of $$\frac{P_f}{P_o}$$

and a pair of elastic means connected respectively to a point of the elementary lever of the first transforming arrangement corresponding to $$\frac{P_e}{P_o}$$

and to said cam, said elastic means being further connected in opposition to a point of said pivoting lever; $P_e$ being the pressure of the gases ahead of the jet forming nozzle, $P_o$ the pressure at the suction end of the compressor and $P_f$ the pressure inside the combustion chamber.

6. In a jet propulsion unit: an air compressor, at least one combustion chamber fed with air under pressure from said compressor, a gas turbine fed by the combustion gases and adapted to drive the compressor, a jet forming nozzle, throttling means combined with said nozzle for adjusting the cross-sectional area thereof, means for transforming the pressure ratio $$\frac{P_e}{P_o}$$

into a movement proportional thereto, similar means for transforming the pressure ratio $$\frac{P_f}{P_o}$$

each transforming arrangement including an elementary lever, a stationary pivot for said lever, a pressure sensitive device submitted to the action of $P_e$ or $P_f$ according to the transforming arrangement considered and adapted to displace its point of application on the corresponding elementary lever, through a distance proportional to said pressure, and a second pressure sensitive means submitted to the pressure $P_o$ and adapted to displace the point of application of the first pressure sensitive device through a distance proportional to $P_o$, and an auxiliary motor associated therewith for transforming the displacement of a predetermined point of the corresponding elementary lever into a force proportional to $$\frac{P_e}{P_o} \text{ or } \frac{P_f}{P_o}$$

according to the arrangement considered, a pivoting lever operatively connected with said throttle means in order to control it and submitted to the action of the first arrangement corresponding to $$\frac{P_e}{P_o}$$

and a cam submitted to the action of the second arrangement corresponding to $$\frac{P_f}{P_o}$$

and adapted to act in opposition with the first arrangement on the lever with a force equal to a determined function of $$\frac{P_f}{P_e}$$

$P_e$ being the pressure of the gases ahead of the reaction jet nozzle, $P_o$ the pressure at the suction end of the compressor and $P_f$ the pressure inside the combustion chamber.

MARCEL HENRI LOUIS SÉDILLE.

REFERENCES CITED

The following references are of record in the file of this patent:

UNITED STATES PATENTS

| Number | Name | Date |
|---|---|---|
| 2,402,363 | Bradbury | June 18, 1946 |
| 2,408,099 | Sherman | Sept. 24, 1946 |
| 2,409,176 | Allen | Oct. 15, 1946 |